Figure 1:
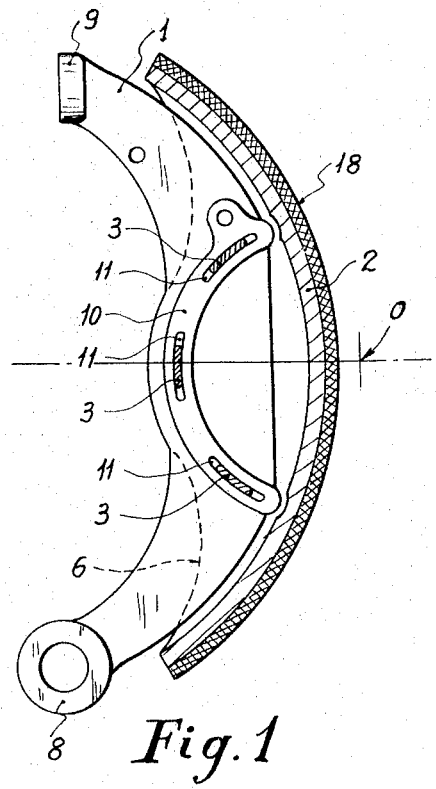

Jan. 10, 1967 C. P. OCERIN 3,297,113
BRAKE MECHANISM

Filed April 22, 1965 2 Sheets-Sheet 1

INVENTOR
Carlos Pujana Ocerin

BY Cushman, Darby & Cushman
ATTORNEYS

Jan. 10, 1967     C. P. OCERIN     3,297,113

BRAKE MECHANISM

Filed April 22, 1965     2 Sheets-Sheet 2

INVENTOR
Carlos Pujana Ocerin
BY Cushman, Darby & Cushman
ATTORNEYS

United States Patent Office 3,297,113
Patented Jan. 10, 1967

3,297,113
BRAKE MECHANISM
Carlos Pujana Ocerin, Villarreal de Urrechua, Spain, assignor to Aparicio Hermanos & Cia., S.A., Guipuzcoa, Spain, a joint-stock company of Spain
Filed Apr. 22, 1965, Ser. No. 450,217
Claims priority, application Spain, Mar. 4, 1965, 310,121
3 Claims. (Cl. 188—78)

This invention relates to improvements to the mechanism of brake shoes.

At present brake shoes are made in a general form by means of two levers articulated at one end and located within a cylindrical drum connected to the axis which is to be braked, for example, connected to a wheel of an automobile, the levers of which are in turn linked or connected at their other end to an operating unit formed by a cylinder and its piston, or by any equivalent mechanical means. Both levers are also connected together by a spring opposing the force generated at the appropriate moment by the said cylinder and piston, or equivalent operating mechanism.

The levers, curved in shape, are provided externally with a lining of suitable material which forms the shoes proper.

With such a brake system, the action of the shoes on the cylindrical surface of the drum is eccentric, that is to say, they are not applied simultaneously by all their surface on the drums, but touching the drum by one end.

Such form of operation is an obvious defect in such brake shoes which has necessitated in many cases replacement by disc brakes, of cheaper construction, but more gentle operation.

In fact, due to this form of expansion, the shoes strongly lock the wheel by the impact produced between the end of said shoes against the drum by which the wheel remains locked causing the latter to skid on the surface. In such form of operation apart from constituting an obvious danger, it produces unequal wear of the materials of the brake and also an oval shape of the drum. It has also been possible to observe unequal operation between the two shoes.

The object of the present invention is to eliminte such defects by causing the shoes to operate concentrically relatively to the drum so that a larger surface of the shoe is used than occurs with the application of the known braking system.

To obtain such effect, the shoes are mounted hanging loose from the respective lever so that they rotate relatively to a geometrical, imaginary, axis. Such rotation is effected by means of a few curved members which, in the manner of cotters, are introduced into corresponding slots in the levers and the shoes so that the shoe is able to rotate relatively to the said geometrical axis in complete security and without appreciable looseness.

By means of this arrangement, the shoe is applied to the drum concentrically and automatically compensated and, moreover, over a large proportion of its surface, which may be calculated at 80%, whilst in the present system of braking it reaches only 30%.

Among other advantages achieved by the application of the invention, there is rapid and gentle deceleration and also progressive braking which prevents skidding of the wheels and, consequently, less wear thereon. In addition, the wear on the lining of the shoes is negligible, uniform and not irregular and rapid, as occurs with existing brakes.

With the object of simplifying the more exact understanding of the object of the present invention, in the accompanying drawings, complementary to the present description, a practical embodiment is illustrated which is merely by way of example and consequently is not exhausted in character, but merely informative.

Figure 2:
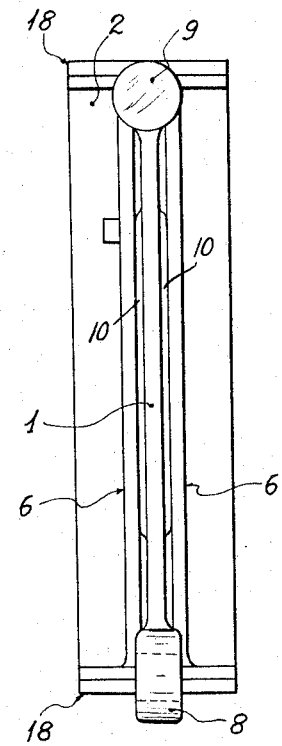
Figure 3:
Figure 4:
Figure 5:
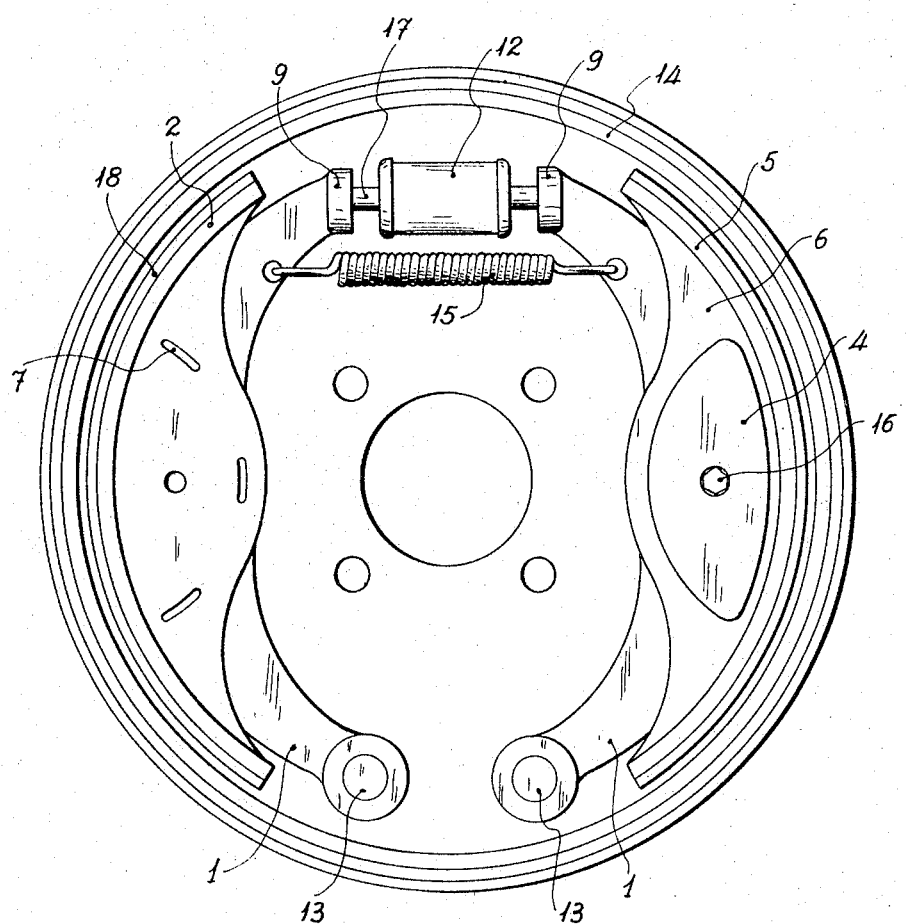

In the drawings:

FIG. 1 is a side view in a cross section on a plane longitudinal of the assembly formed by a lever and an articulated shoe according to the invention, FIG. 2 is a view through the hollow part of the assembly shown in the previous drawing, FIGS. 3 and 4 correspond to a front and side view respectively of the radially rotating plates, FIG. 5 is a side view of a brake constructed in accordance with the present invention.

A pressure lever 1 is arcuate, plane and provided with normal plates at its two ends 8 and 9, and an integrally formed radial member 10 is positioned in its central portion. The member 10 is in the form of an arc and has axial slots 11 which coincide with slots of a shoe 2.

A member 10 may be formed on each side of the lever 1, as shown in FIGURE 2, and of course, the members 10 may be separately attached to the lever 1 and not necessarily formed as an integral part of the lever.

These slots are arranged over a circumference, the centre of rotation of which is the point 0, in such form that, when the shoe and the lever are mounted, and connected by rotatable plates 3, they make it possible to apply to the shoe the appropriate force so that at any moment the shoe may adapt itself prefectly to the drum 14 of the wheel or mechanism to be braked.

Once mounted on a gudgeon pin of the support plate, the plate end 8 locates the shoe and lever assembly in the braking position, permitting it to turn about a pivot 13, so that the pressure of the cylinder of wheel 12, through the rod 17 which acts on the end 9, can push with force the swinging shoe 2 against the rotary drum 14 causing rapid deceleration and stopping thereof, when the lining 18 is applied to almost all its surface.

The return to the original position of rest of the lever and shoe unit is effected by the traction spring 15.

The shoe 2, in the inner portion of its arc 5, has two relatively parallel surfaces 6 which, not only serve to increase the strength of the shoe, but also serve to receive the lever 1 and permit the connection of both member (lever-shoe) by means of the plates 3. These plates ensure efficient connection of the shoe and lever at the point 0, which is ideal for the concentric and complete action of the shoe on the wheel drum to be stopped.

This new connecting system makes the shoe self-compensating.

The plates 3 have the shape of an arc, to permit sliding of the shoe on the pressure lever, on being located on the circumference rotating about the centre 0.

The shoe has slots 7 formed as arcs of a circle with centre at the point 0.

In these slots the plates 3 are adjusted and are axially locked by a pair of cover plates 4, one on the outside of each surface 6 of the shoe 2 which clamp the shoe by an anchor bolt.

This original system of linking the shoe permits the latter to turn about an imaginary point 0 without any material axis existing at this point.

The system is designed so that the entire surface of the lining of the shoe is effective in its friction when the pressure lever is urged against the friction surface of the rotary drum 14.

Among the advantages are the following:

(a) greater deceleration and braking effect, (b) greater simplicity of mechanism and, consequently, lower costs, (c) increased stability, important for reducing lurching to the minimum and keeping the direction of the vehicle straight on the road during emergency steps.

(d) reduction of braking distance, (e) great braking power, and (f) reduction of pressure to be applied to the pedal, which signifies elimination of the serve brake.

The number of plates 3 and therefore corresponding slots 11 and 7, may be different from that described. Likewise, equivalent mechanical devices may be provided to produce the same effect provided that such devices permit rotation of the shoe relatively to a point disposed on the periphery of the shoe.

The nature of the invention and an embodiment for its industrial application have been sufficiently described, it is only necessary to add that in the assembly and components thereof, it is possible to introduce changes of shape, materials and arrangement, provided that such alternations are not a substantial variation of the invention.

What I claim is:

1. A self-centering brake shoe mechanism comprising: a brake shoe which can be moved into and out of contact with a brake drum, a lever for supporting said brake shoe and for displacing the shoe toward and away from the drum, said lever being mounted for pivotal movement at one end and contacted by an operating rod means at its opposite end for displacement of the lever about an axis at said pivotal mounting point, and means for articulating said brake shoe to said lever so that said shoe can be rotated slightly relative to said lever about an imaginary axis of rotation which is located outwardly from the point of articulation of said shoe to said lever and toward said brake drum, said axis of rotation being positioned along a median line drawn equidistant from the pivotal mounting axis of said lever and the end of said lever at which said operating rod is contacted with the lever, said means for articulation including transverse arcuate members located in arcuate slots which are formed in alignment in said shoe and said lever, said arcuate members and arcuate slots being disposed along an imaginary arc of a circle having its center in the imaginary axis of rotation for said shoe, whereby a movement of the brake shoe toward the brake drum will effect a self-centering, uniform pressure contact of a lining for the shoe with the drum.

2. The mechanism of claim 1 wherein said articulation means further includes two parallel plates projecting inwardly from the inner circumference of said brake shoe for receiving a portion of said lever therebetween, said lever and said plates having said arcuate slots formed therein along said imaginary arc of a circle with the slots of the lever being positioned for alignment with the slots of the shoe when the two members are articulated, and said transverse arcuate members being located in said aligned slots for connecting the shoe to the lever, said arcuate members being of a smaller size than said slots for permitting limited rotational movement of the shoe about said imaginary axis.

3. The brake mechanism of claim 2 and including means for securing cover plates to outside surfaces of said parallel plates for retaining said arcuate members in their operative positions within said aligned slots, whereby said arcuate members serve as a connection between the shoe and the lever while functioning to permit a guiding and sliding of the shoe relative to the lever.

References Cited by the Examiner

UNITED STATES PATENTS 1,966,375    7/1934    Brice _____ 188—78 X
1,977,916   10/1934    Nelson _____ 188—250 X MILTON BUCHLER, *Primary Examiner.*

B. S. MOWRY, *Assistant Examiner.*